Dec. 15, 1936.  W. TIDDY  2,064,007
CARBURETED WATER GAS SET
Filed June 5, 1931
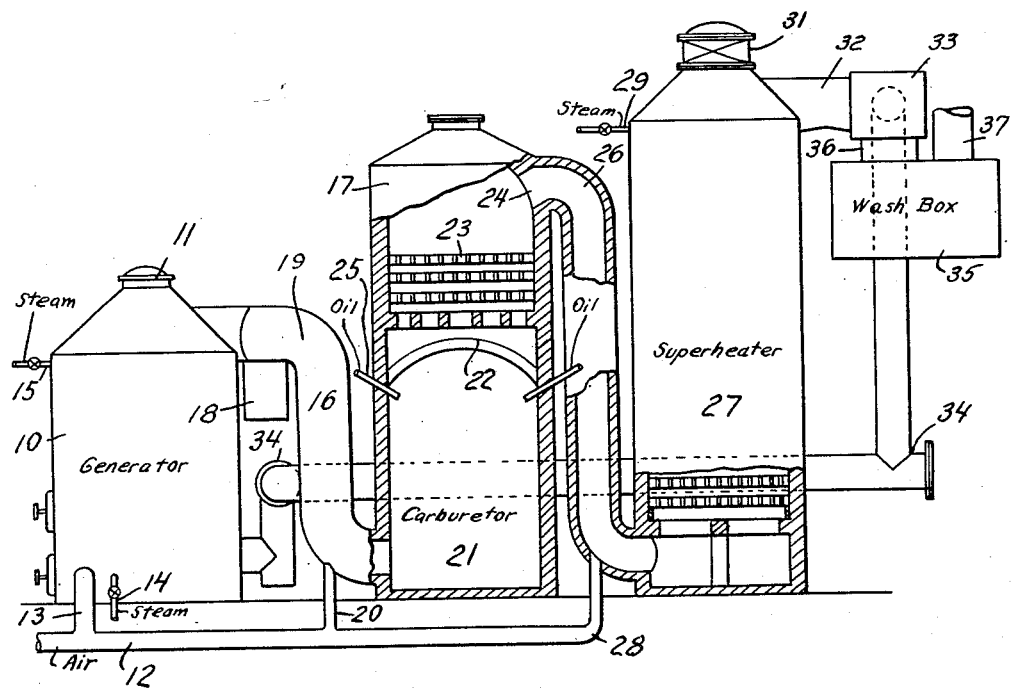
INVENTOR
William Tiddy
BY
ATTORNEY Patented Dec. 15, 1936

2,064,007

UNITED STATES PATENT OFFICE 2,064,007

CARBURETED WATER GAS SET

William Tiddy, Scarsdale, N. Y., assignor to Semet-Solvay Engineering Corporation, New York, N. Y., a corporation of New York Application June 5, 1931, Serial No. 542,287

2 Claims. (Cl. 48—80)

This invention is directed to the manufacture of carbureted water gas and more particularly to the construction and operation of a carbureted water gas set involving a generator, carburetor and superheater, connected in series.

One object of this invention is to provide a carbureted water gas set, the carburetor of which is so designed as to permit enrichment of water gas passing therethrough with crude oils such as gas, Bunker C or unrefined oil, which upon passage through the heated carburetor leave a solid carbonaceous residue. Another object of this invention is to devise a process of making water gas involving upflow of water gas through a carburetor having a base gas inlet and a top outlet, the major portion of the carburetor from the base up being devoid of checkerbrick and substantially unobstructed, the process involving the introduction of gas, Bunker C or crude oils into the water gas stream so that the oil is caused to commingle with the gas stream and efficient admixture of the oil gas and water gas is accomplished. Preferably, the mixture of gas is partially fixed before leaving the carburetor by passage over hot checkerbrick disposed in the top portion of the carburetor.

Heretofore, the usual water gas set consisted of a generator containing a bed of fuel, a carburetor, and a superheater, connected in series, the top of the generator communicating with the top of the carburetor, and the base of the carburetor communicating with the base of the superheater. The interiors of both the carburetor and superheater were built up with checkerbrick arranged in staggered relation to form tortuous flues. In the manufacture of water gas, the blast gases produced in the generator by the passage of air or other oxygen-containing gas through the fuel bed therein were passed from the generator into and through the carburetor and superheater. Secondary air admitted to the carburetor and the superheater was admixed with the blast gases and this mixture ignited in its passage over the checkerbrick and burned in these chambers, thus heating the checkerbrick.

Thereafter, the blasting cycle was discontinued and steam admitted into the generator, passing therethrough, reacting with the fuel bed to form water gas, which was passed into the carburetor. Oil was introduced into the top of the carburetor, the resultant oil gas mixing with the water gas in passing over the checkerbrick therein. The mixture of oil gas and water gas, in its passage through the carburetor and superheater chambers was fixed to form carbureted water gas. If desired, steam was thereafter passed in reverse flow through the superheater and carburetor units down through the fuel bed in the generator, the resultant water gas being withdrawn directly from the base of the generator. When the temperatures of the fuel bed and the carburetor and superheater chambers had been reduced so that water gas could no longer be efficiently generated, the gas making cycles were discontinued and the fuel bed again blasted with air or other oxygen-containing gas and upon completion of this blasting cycle, the water gas making cycles were repeated.

It has been proposed to substitute for the usual enriching oil, which does not form substantial carbonaceous deposits on the checkerbrick, crudes, or unrefined oils. In practice, however, it has been found that such oils leave an increased carbonaceous deposit on the checkerbrick in the carburetor, clogging the flues and necessitating frequent shutdowns for recheckering. The arrangement of checkerwork in the carburetor precludes the cleaning thereof without removal of the checkerbrick from the carburetor chamber and consequently the entire checkerwork had to be replaced, thus entailing arduous and time-consuming labor and reducing the gas-making capacity of the plant, since the carburetor had to be taken out of operation for a considerable period of time.

In accordance with Doherty Patent No. 992,944, of May 23, 1911, the amount of checkerbrick in the carburetor of a water gas set has been reduced and the carbureting oil has been introduced into an unobstructed space at the top of the carburetor, into the downwardly flowing water gas stream, so as to obtain substantially complete volatilization of the oil before it contacts with hot checkerbrick to thereby reduce or eliminate the formation of carbonaceous deposits. Further, in view of the clogging of the checkerbrick when using crude oils, it has been proposed to omit the checkerbrick in the carburetor and introduce crude oil as the enriching medium into the top thereof, the oil gas and water gas flowing in the same direction down through the carburetor into the base of the superheater and up therethrough.

In contradistinction to the above operations, the carbureted water gas set of this invention involves a generator containing a bed of fuel, a carburetor, and a superheater. Preferably, each unit is contained in a separate and detached shell. The separate shells are connected in series with the top of the generator communicating with the base of the carburetor and the top of the carburetor communicating with the base of the superheater. An offtake leads from the top of the superheater to a washbox or seal and an offtake, separate from and independent of the connection between the generator and carburetor, leads from the base of the generator to a washbox or seal, which may be the same washbox into which the offtake from the superheater leads. The interior of the superheater may be built up with checkerbrick defining tortuous flues for the passage of gas as is well known in this art.

In accordance with this invention, the base portion of the carburetor is devoid of checkerbrick and substantially unobstructed throughout its major portion. At a point in the carburetor approximately one-third the distance from the top, arches are built which support checkerwork defining tortuous flues in the top portion of the carburetor. Gas oils, Bunker C or crude oils are introduced into the carburetor at points circumferentially of this shell in the neighborhood of the arches. The oil is directed downwardly into the upflowing water gas stream. Due to the high temperatures prevailing in the neighborhood of the arches, as more fully explained hereinafter, the oil is cracked and volatilized substantially immediately as it enters the carburetor, the oil gas mixing with the water gas and the mixture passing through the checkerbrick in the top of the carburetor and is thus partially fixed before it is introduced into the superheater. The carbonaceous residue formed during the cracking of the crude oil settles to the base of the carburetor, passing counter-current to the flow of water gas therethrough so that substantially all residual volatiles are removed therefrom. The residue collects at the base of the carburetor during the water gas making cycle, where it does not interfere with the gas flow through the carburetor. During the succeeding blasting cycle, this hot residue serves to initiate the ignition of the mixture of blast gases and secondary air. Further, it is partially burned by the passage thereover of the hot blast gases admixed with secondary air, thus retarding accumulation thereof. When the residue accumulates to such an extent that it impedes flow, the major portion thereof is withdrawn through clean-out doors provided in the carburetor for this purpose.

In the accompanying drawing, forming a part of this specification and showing, for the purpose of exemplification, a preferred form of this invention, without limiting the claimed invention to such illustrative instance, the single figure is a side elevation, partly in section, of a carbureted water gas set illustrating the preferred embodiment of this invention.

Referring to the drawing, numeral 10 indicates a generator containing a bed of fuel (not shown). As customary, the top of the generator is provided with a charging opening 11 for fuel. Air or other oxygen-containing gas for blasting the fuel bed may be supplied through pipe 12 having one end communicating with an air blower or pump and provided with a conduit 13, leading into the generator below the grate supporting the fuel bed. A valve controlled pipe 14 leads into the base of the generator, and a valve controlled pipe 15 into the top of the generator above the fuel bed to supply steam for "uprun" and "downrun" water gas making cycles respectively.

Conduit 16 communicably connects the top of generator 10 with the base of the carburetor 17. A dust catcher 18 is associated with angle bend 19 in conduit 16 to receive coal or dust particles separating out from the gas due to the baffling action caused by the change in direction of flow of gas from the top of the generator through conduit 16 into the base of the carburetor 17. Pipe 20 communicates with the main 12 to provide secondary air or other oxygen-containing gas to the carburetor 17. The major portion of carburetor 17, from the base up, as indicated by the reference numeral 21, is unobstructed. At the top of the unobstructed portion 21, refractory arches 22 disposed diametrically from one side of the carburetor to the other, bind with the refractory lining of the carburetor. Checkerbrick 23 of a type usually employed in the carburetors of water gas sets rest on the arches 22 and define tortuous flues for the passage of gas. Checkerbrick 23 extends from the arches 23 to a point somewhat below the top outlet 24.

Gas oils or Bunker C oil are introduced into the carburetor through oil sprays 25 disposed circumferentially about the carburetor shell at points in the neighborhood of and below the arches 22. Oil sprays 25 are preferably downwardly directed so that the oil is introduced in a direction counter-current to the upflow of water gas through the carburetor. Due to the high temperatures prevailing in the neighborhood of arches 22, the oil is substantially instantaneously cracked and vaporized, the resultant oil vapors commingling with the water gas and the resulting mixture passing through checkers 23. Downward introduction of oil through a series of spaced sprays into the upwardly flowing water gas causes agitation of the water gas and efficient admixture of water gas with oil gas, thus resulting in an improved mixture of oil gas with water gas and increasing the oil efficiencies of the process, particularly as compared with prior practice, involving co-current flow of water gas and oil introduced into the carburetor. The carbonaceous residue formed in the oil cracking settles through the unobstructed portion 21 of the carburetor and is contacted with hot water gas in its passage down through the carburetor. This results in the removal of any residual volatiles in the residue. The residue accumulates on the base of carburetor 17 where it does not interfere with flow of water gas through the carburetor. When sufficient residue has accumulated on the base of the carburetor, it is withdrawn through a clean-out door (not shown) provided at the base of the carburetor for this purpose.

Conduit 26 connects the top outlet 24 of carburetor 17 with the base of the superheater 27, the interior of which is preferably of usual checkerbrick construction. Tertiary air or other oxygen-containing gas may be admitted to the base of superheater 27 through pipe 28, which extends from pipe 12 and leads into the conduit 26. Steam for backrun water gas making cycles may be supplied to the top of superheater 27 through valve controlled steam pipe 29. As customary, the top of superheater 27 is equipped with a valve controlled blast offtake 31 and a water gas offtake 32 leading from the top of the superheater to a housing 33. A backrun pipe or offtake 34 leads from the base of generator 10 into housing 33. Flow through conduits 32 and 34 is controlled by a single valve positioned in housing 33 and arranged to open conduit 32, permitting flow of gas therethrough and simultaneously close conduit 34 preventing flow of gas therethrough and vice versa, as more fully disclosed in Patent No. 1,605,081, granted November 2, 1926.

Housing 33 communicates with a washbox or seal 35 through conduit 36. A gas offtake 37 leads from the washbox 35.

The operation of the above described set may comprise three cycles in any desired order; to wit: "blasting", "uprun", and "backrun" cycles. During the blasting cycle, air or other oxygen-containing gas is passed into the generator through air main 13, up through the fuel bed therein, reacting therewith to form blast gases and raising the temperature thereof until the bed of fuel becomes an incandescent mass. The resultant blast gases are passed from the generator 10 through conduit 16 into the carburetor 21, and up therethrough. Secondary air is admitted to the carburetor through pipe 20. The mixture of air and blast gases heats the base portion of the carburetor, ignition of the mixture being initiated by contact with the hot carbonaceous residue accumulated at the base of the carburetors. This residue is burned by the passage of blast gases admixed with secondary air thereover. Arches 22 and checkerbrick 23 serve as large reservoirs of heat, and cause the complete ignition and burning of the blast gases admixed with secondary air. As a result, the arches 22 and checkerbrick 23 become highly heated because of the combustion of the mixture of blast gases and air in contact therewith during its passage through the carburetor. Radiation and conduction of heat from the arches 22 and the checkerbrick 23, resting thereon, results in the highest temperatures in the carburetor prevailing in the neighborhood of the arches. The gases from the carburetor are passed through conduit 26 where they may be mixed with tertiary air entering at 28, thence into and through superheater 27, where combustion of the gases is completed. The waste gases leave the superheater through valve controlled stack 31.

Upon completion of this blasting cycle, which may last approximately three minutes, valve 31 is closed and the valve controlling the flow of air through passage 12 is also closed. An uprun cycle may then be begun. Steam is passed into the base of the generator through inlet 14 and the valve in housing 33, positioned to permit flow through conduit 32, into washbox 35, and prevent flow through conduit 34 into the washbox. The steam admitted at 14 passes up through the fuel bed, reacting therewith, to form water gas, which passes from the generator through conduit 16 into the unobstructed portion of carburetor 17.

Gas or crude oil is discharged into the carburetor through oil sprays 25. The high temperatures prevailing at the point of introduction of the crude oil causes efficient volatilization and cracking of the oil with the production of carbonaceous material and oil gas. Introducing the oil in a counter-current direction to the flow of water gas through the carburetor 17 results in improved dispersion and admixture of the oil particles and resultant vapors with the water gas. The oil gas formed by the vaporization of the oil particles becomes intimately mixed with the water gas by reason of the agitation of the two fluids within the carburetor, resulting from the counter-flow. Carbonaceous residue formed by the cracking of the oil settles down through the large unobstructed portion 21, countercurrent to the flow of water gas therethrough. The residue accumulates at the base of the carburetor during the water gas making cycles, where it does not interfere with the flow of gas through the carburetor. During the subsequent blasting cycle, as indicated above, the residue is partially consumed by the passage of blast gases and secondary air thereover. Consequently, the removal of the residue is required only at infrequent intervals. Passage of the mixture of oil gas and water gas over the checkerbrick 23 results in partial fixing of the mixture of oil gas and water gas prior to the introduction of the mixture into the superheater. The resultant mixture passes from the carburetor, through conduit 26, into the superheater 27, where fixation is completed. From the superheater, the carbureted water gas formed passes into the washbox 35, from which it is discharged through outlet 37 into a suitable holder.

The uprun period may be followed by a backrun. Conduit 34 is opened and 32 closed by means of the valve in housing 33 and steam is shut off through inlet 14 and turned on at inlet 29. The steam admitted at 29 is superheated in its passage through the superheater and carburetor and then passes into the top of the generator downwardly through the fuel bed therein, the resultant water gas being withdrawn from the generator through conduit 34. If desired, crude oil or other enriching medium may be added through oil sprays 25 and the mixture of superheated steam and oil gas passed through pipe 16, down through the fuel bed in the generator, the resultant carbureted water gas being withdrawn directly from the generator through pipe 34. In lieu of, or in addition to, the complete backrun cycle above described, a partial backrun cycle may be conducted in the set. For this purpose, steam is introduced at 15, passed down through the generator, the resultant water gas being withdrawn directly from the base of the generator through the backrun pipe 34.

It will be noted that in accordance with this invention gas oils, Bunker C or crude oils may be utilized in the enrichment of water gas, the large unobstructed space in the base portion of the carburetor permitting accumulation of the carbonaceous materials formed from the cracking of the oil, the carbonaceous residue being readily removed from the base of the carburetor when desired. Furthermore, the introduction of a crude oil at a point near the arches in a direction countercurrent to the upward flow of water gas through the carburetor results in more efficient admixture of the oil gas with the water gas, improving the oil efficiencies.

The invention as hereinabove described is embodied in a particular form of construction but it is to be understood that it may be variously embodied within the scope of the following claims.

I claim:

1. A carbureted water gas set comprising a generator, a single carburetor and a superheater connected in series, the individual units being contained in separate and detached shells, the generator being connected with the base of the carburetor and the top of the carburetor being connected with the superheater, a gas offtake from the superheater, an arch in said carburetor disposed above the mid portion and arranged to support checkerbrick in the top of the carburetor, the portion of the carburetor below the arch being devoid of checkerbrick, and an oil spray extending through the wall of the carburetor near the arch arranged to discharge oil into the stream of water gas passing up through the carburetor during the water gas making cycles.

2. A carbureted water gas set comprising a single generator, a single carburetor, and a single superheater, connected in series, the individual units being contained in separate and detached shells, the top of the generator being connected with the base of the carburetor and the top of the carburetor connected with the base of the superheater, a gas offtake from the top of the superheater, a gas offtake from the base of the generator, separate from and independent of the connection between the generator and the carburetor, an arch in said carburetor, disposed above the mid portion and arranged to support checkerbrick in the top of the carburetor, the portion of the carburetor below the arch being devoid of checkerbrick, and oil sprays disposed circumferentially of the carburetor, disposed near the arch, arranged to discharge oil downwardly into the stream of water gas passing up through the carburetor during the water gas making cycles.

WILLIAM TIDDY.